US008270298B2

(12) United States Patent
Lundh et al.

(10) Patent No.: US 8,270,298 B2
(45) Date of Patent: Sep. 18, 2012

(54) METHOD AND ARRANGEMENT FOR FLOW CONTROL IN UMTS USING INFORMATION IN UBS FIELD

(75) Inventors: Peter Lundh, Skarholmen (SE); Szilveszter Nádas, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 916 days.

(21) Appl. No.: 12/064,902

(22) PCT Filed: Aug. 26, 2005

(86) PCT No.: PCT/SE2005/001247
§ 371 (c)(1),
(2), (4) Date: Sep. 17, 2008

(87) PCT Pub. No.: WO2007/024167
PCT Pub. Date: Mar. 1, 2007

(65) Prior Publication Data
US 2009/0221292 A1 Sep. 3, 2009

(30) Foreign Application Priority Data

Aug. 29, 2005 (DE) .......................... 10 2005 040 896

(51) Int. Cl.
*G06F 11/00* (2006.01)
*G08C 15/00* (2006.01)
*H04L 12/26* (2006.01)
(52) U.S. Cl. ......... 370/235; 370/232; 370/252; 370/412
(58) Field of Classification Search .................. 370/232, 370/235, 412, 395.4, 428–429
See application file for complete search history.

(56) References Cited

U.S. PATENT DOCUMENTS

| 6,067,301 | A | * | 5/2000 | Aatresh | ......................... 370/418 |
| 6,108,306 | A | * | 8/2000 | Kalkunte et al. | .............. 370/235 |
| 6,438,134 | B1 | * | 8/2002 | Chow et al. | .................... 370/412 |
| 6,470,016 | B1 | * | 10/2002 | Kalkunte et al. | ......... 370/395.41 |
| 6,728,365 | B1 | * | 4/2004 | Li et al. | .......................... 379/329 |
| 7,352,761 | B2 | * | 4/2008 | Lodha et al. | .................. 370/412 |
| 2002/0174279 | A1 | | 11/2002 | Wynne | |

(Continued)

FOREIGN PATENT DOCUMENTS

EP 0901301 A 3/1999

(Continued)

*Primary Examiner* — Warner Wong
(74) *Attorney, Agent, or Firm* — Roger S. Burleigh

(57) ABSTRACT

A network includes a first node and a second node and data frames are transmitted from the first node to the second node. Each of the data frames carry information belonging to one of a plurality of data flows. A determining unit (911) determines at periodically repeated times, for each of the data flows, whether there are more data frames in the first node waiting to be transmitted. A capacity allocating unit (919) allocates for each of those data flows for which no data frames have been waiting to be transmitted for a predetermined time period, only a small amount of the totally available bitrate or bandwidth for transmission from the first node to the second node. It also allocates for each of the remaining data flows, for transmission from the first node to the second node, a share of the rest of the totally available bitrate or bandwidth, so that the sum of the shares for all said remaining data flows is equal to the rest. The first node can be a radio network controller and the second node a radio base station, the data frames forwarded in an HS-DSCH over an Iub interface.

18 Claims, 6 Drawing Sheets

U.S. PATENT DOCUMENTS

| | | | |
|---|---|---|---|
| 2003/0223445 A1* | 12/2003 | Lodha | 370/412 |
| 2004/0017795 A1 | 1/2004 | Abraham et al. | |
| 2004/0027997 A1 | 2/2004 | Terry et al. | |
| 2006/0034168 A1* | 2/2006 | Bakker et al. | 370/229 |
| 2006/0198304 A1* | 9/2006 | Matefi et al. | 370/230 |
| 2011/0096689 A1* | 4/2011 | Sindhu et al. | 370/252 |

FOREIGN PATENT DOCUMENTS

| | | |
|---|---|---|
| EP | 1333621 A1 | 8/2003 |
| GB | 2375927 A | 5/2001 |

* cited by examiner

METHOD AND ARRANGEMENT FOR FLOW CONTROL IN UMTS USING INFORMATION IN UBS FIELD

The present invention relates to flow control for transmission of data frames from a node to another node, in particular a network including a first node and a second node or a data transmitting node and a data receiving node, and a method of transmitting data frames from a first node to a second node.

BACKGROUND

The universal mobile telecommunications system (UMTS) is a network technology allowing transmission both of voice and high-speed data. It is part of the third-generation (3G) wireless standards, as specified by the Third-generation partnership project (3GPP). Wideband code-division multiple access (WCDMA), also called wideband CDMA, is one method for radio transmission used in UMTS. UMTS is a development of GSM/GPRS supporting packetized voice and data transmissions.

The method called high speed downlink packet access (HSDPA) is an enhancement of UMTS for increasing the capability of transmitting data, resulting in a reduced cost per transmitted bit and a greater spectral efficiency, in addition to significant improvements in downlink data speeds. HSDPA can give improvements of at least two to three times the current capacity. It is based on the WCDMA standard and uses the same spectrum. HSDPA uses quadrature phase shift keying (QPSK) and 16-quadrature amplitude modulation (16QAM).

The HSDPA method uses a distributed architecture in order to achieve a low delay link adaptation by performing the most important process steps in the radio base stations (RBSs) and thus close to the air interface, see FIG. 1. HSDPA uses well established processing steps, including fast physical layer (L1) retransmission for faulty packets, combining and link adaptation techniques, to obtain improved packet data transmission.

The HSDPA process steps basically include:
scheduling in the radio base stations for the downlink packet data operation;
higher-order modulation;
adaptive modulation and coding;
hybrid automatic repeat requests (HARQs) for retransmissions;
physical layer feedback of the momentary channel condition; and
transmission in a high-speed downlink shared channel (HS-DSCH) allowing several users to share an air interface channel.

In the following some important features of HSDPA will be described.

1. Adaptive Modulation and Coding

HSDPA uses advanced link adaptation and adaptive modulation and coding.

2. Fast Scheduling

In HSDPA data traffic is scheduled in the radio base stations. HSDPA uses information on channel quality, terminal capabilities, quality of service (QoS), and power/code availability to achieve efficient scheduling of data packet transmissions.

3. Fast L1 Retransmissions

When a link error occurs, a mobile terminal immediately requests the retransmission of the lost or erroneous data packets. This operation is denoted as a method including hybrid automatic repeat requests (HARQs) for reducing the delays in and increasing the efficiency of retransmissions. HARQ control is performed in the radio base stations, as illustrated in FIG. 2.

4. Channel Quality Feedback

In the radio base stations, according to the HSDPA method, estimates of the channel quality of each active user are collected and used. This feedback provides current information on a wide range of channel variable physical layer conditions, including power control, ack/nack ratio, QoS, and HSDPA-specific user feedback.

5. High-Speed Downlink Shared Channels (HS-DSCHs)

HSDPA operation is carried in high-speed downlink shared channels using a frame length of only two milliseconds, compared to frame lengths of 10, 20, 40 or 80 ms used in previously used downlink shared channels (DSCHs). Such downlink shared channels are downlink transport channels, each of which may be shared by several user equipments. A downlink shared channel is used to carry dedicated control or traffic data from the SRNC (Serving Radio Network Controller). A DSCH will be associated with one or several downlink DCHs (Dedicated Channels). The HS-DSCHs provide 16-level quadrature amplitude modulation (16-QAM), link adaptation, and the combining of retransmissions in L1 with HARQs. HSDPA uses high-speed shared control channels (HS-SCCHs) to carry the required modulation and retransmission information. Uplink high-speed dedicated physical control channels (HS-DPCCHs) carry automatic repeat request (ARQ) acknowledgement messages, provide downlink quality feedback and transmit other necessary control information in the uplinks.

HSDPA requires a flow control algorithm or method that controls the transmission of data frames in an HS-DSCH, as specified by e.g. TS 25.401 from 3GPP, between a radio network controller and a radio base station. The algorithm for flow control is not standardized, but control messages, e.g. the message "Capacity Allocation", are standardized. In order to manage the flow control, the RBS calculates the allocations to be carried in the "Capacity Allocation" messages sent to the RNC, and the RNC sends data frames in the HS-DSCH to the RBS according to the information in the "Capacity Allocation" messages, one allocation of capacity for each flow of data. When there is more data to send from the RNC, the information element (IE) "User Buffer Size" (UBS) in the HS-DSCH data frames is larger than zero. When the data frame has emptied the RNC buffer for the respective flow of data, UBS is set to zero.

The flow control algorithm has to manage limitations for both the air-interface and the Iub HS-DSCH bandwidth, Iub being the interface between an RNC and an RBS.

More particularly, the transfer of a data frame in an HS-DSCH from an RNC to an RBS is made in the following way. After the RNC has been granted capacity by the RBS, as obtained from a capacity allocation control frame or from an initial capacity allocation control frame received from the RBS, as described in 3GPP TS 25.433, and the RNC has data waiting to be sent, the data frame is used to transfer the data in the HS-DSCH. If the RNC has been granted capacity by the RBS using the initial capacity allocation control frame as described in 3GPP TS 25.433, this capacity is valid for only the first data frame transmission in the HS-DSCH. When data is waiting to be transferred, and a capacity allocation control frame has been received, a data frame in the HS-DSCH will be transmitted immediately according to the received allocation, i.e. using the bandwidth corresponding to this allocation. Each data frame sent in an HS-DSCH includes the information element "User Buffer Size" to indicate the amount of data pending for a respective flow for an indicated priority level.

SUMMARY

It is an object of the invention to provide an efficient flow control algorithm.

It is another object of the invention to provide a flow control algorithm that considers the fact the data flows can be inactive, i.e. that for some time periods there may be no more data in the flows to be transmitted.

A flow control method, also called flow control algorithm or flow control function, is proposed that has states stored per radio base station. If such states are not stored per radio base station the detection of inactive users is not needed. However, storing such flow control states per radio base station can result in a better transport network utilization. In the method as proposed herein the value of the information element "User Buffer Size" is used for the flow control. Priority queue flows for which data are waiting to be transmitted get a calculated or estimated capacity allocation, i.e. a highest possible bitrate for transmission, considering the number of priority queue flows and conditions in neighboring networks, and priority queue flows for which no data have been waiting to be transmitted for a predetermined time period get a "background" or minimum predefined capacity allocation value.

An advantage of this method is that only active priority queue flows compete for the available bandwidth, whereas inactive priority queue flows only use very small capacity allocations. Otherwise, if all priority queue flows would be given the calculated or estimated capacity allocation, i.e. bandwidth or bitrate, some part of the total transmission capacity available for the considered type of data transmission would be wasted, said part corresponding to that bandwidth that is reserved for the inactive priority flows.

The purpose of using such minimum capacity allocations for inactive priority queue flows is to avoid using the sequence of first sending a message with a capacity request sent from the radio network controller, this resulting in that a capacity allocation message is sent from the radio base station to the radio network controller before data can be start to sent from the radio network controller to the radio base station. The inactive priority flows, i.e. flows for which no data is waiting to be transmitted, are detected by considering the value of the information element "User Buffer Size", storing states per priority queue and using inactivity timers.

BRIEF DESCRIPTION OF THE DRAWINGS

The invention will now be described by way of non-limiting embodiments with reference to the accompanying drawings, in which.

DETAILED DESCRIPTION

The general flow of information in a system built according to UMTS including both a mobile telephony network and some other network, for information transmitted from the other network to a user equipment (UE) in the mobile telephony network, using high speed downlink packet access (HSDPA), in particular the flow between a radio network controller (RNC) and a radio base station (RBS) in the mobile telephony network, will now be described with reference to FIGS. 3-6. These figures include mainly only units and functions that are relevant to or needed for said general flow of information.

Figure 1:
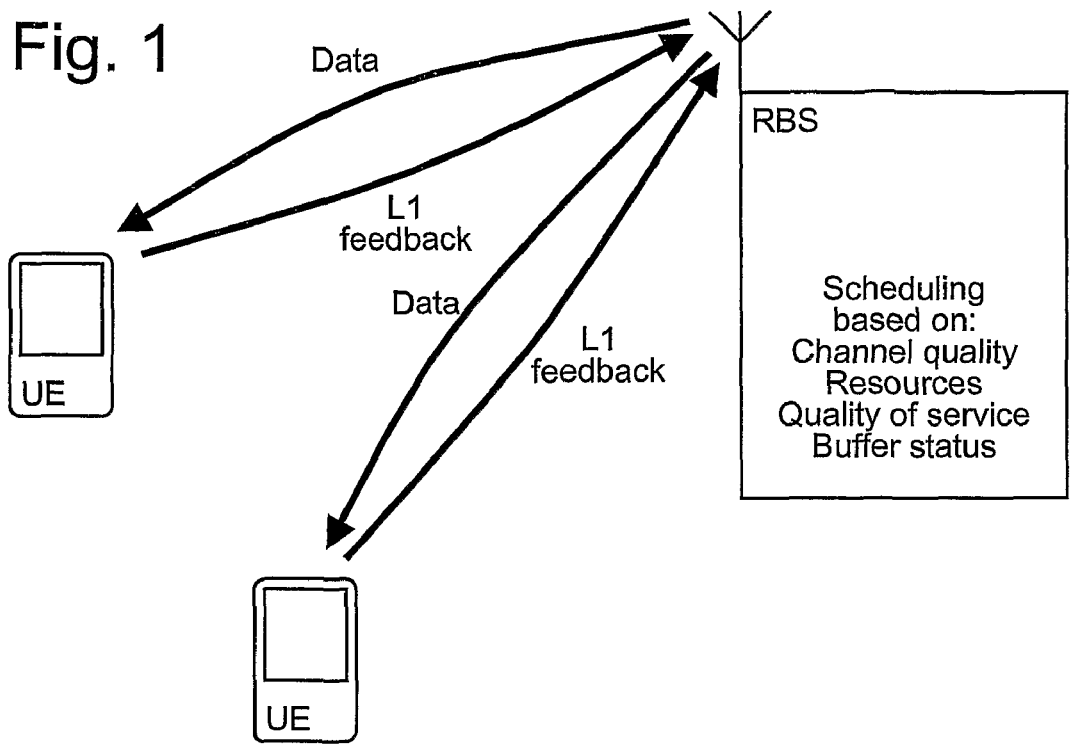
FIG. 1 is a schematic of communication between a radio base station and user equipments using high-speed down-link data transmission.
Figure 2:
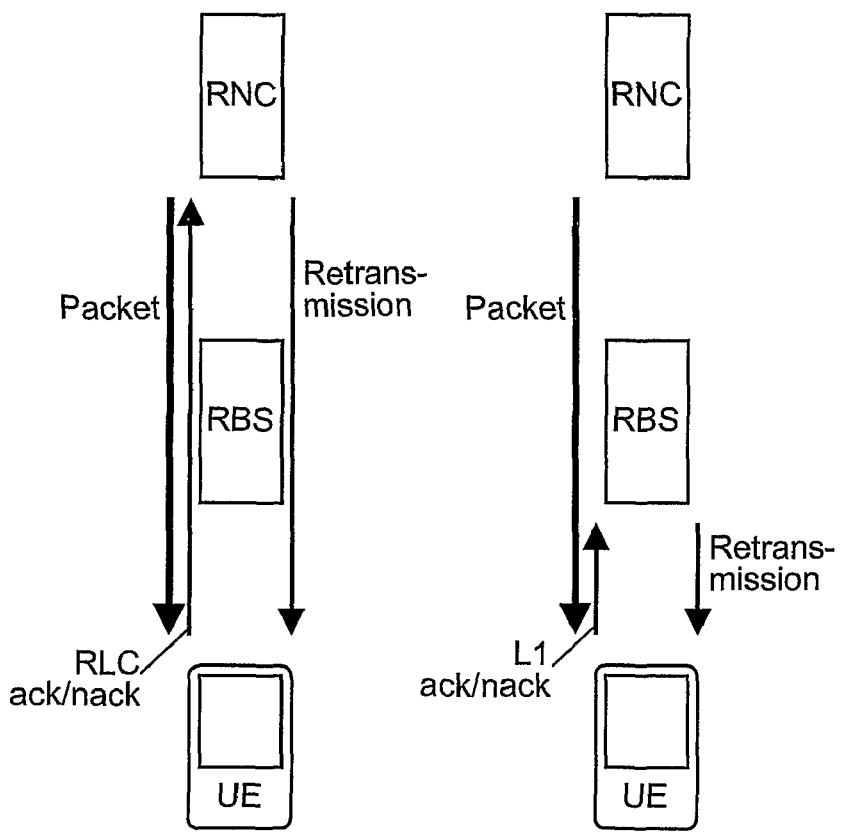
FIG. 2 is a schematic illustrating differences in data transmission to user equipments using a shared downlink channel according to two different methods.
Figure 3:
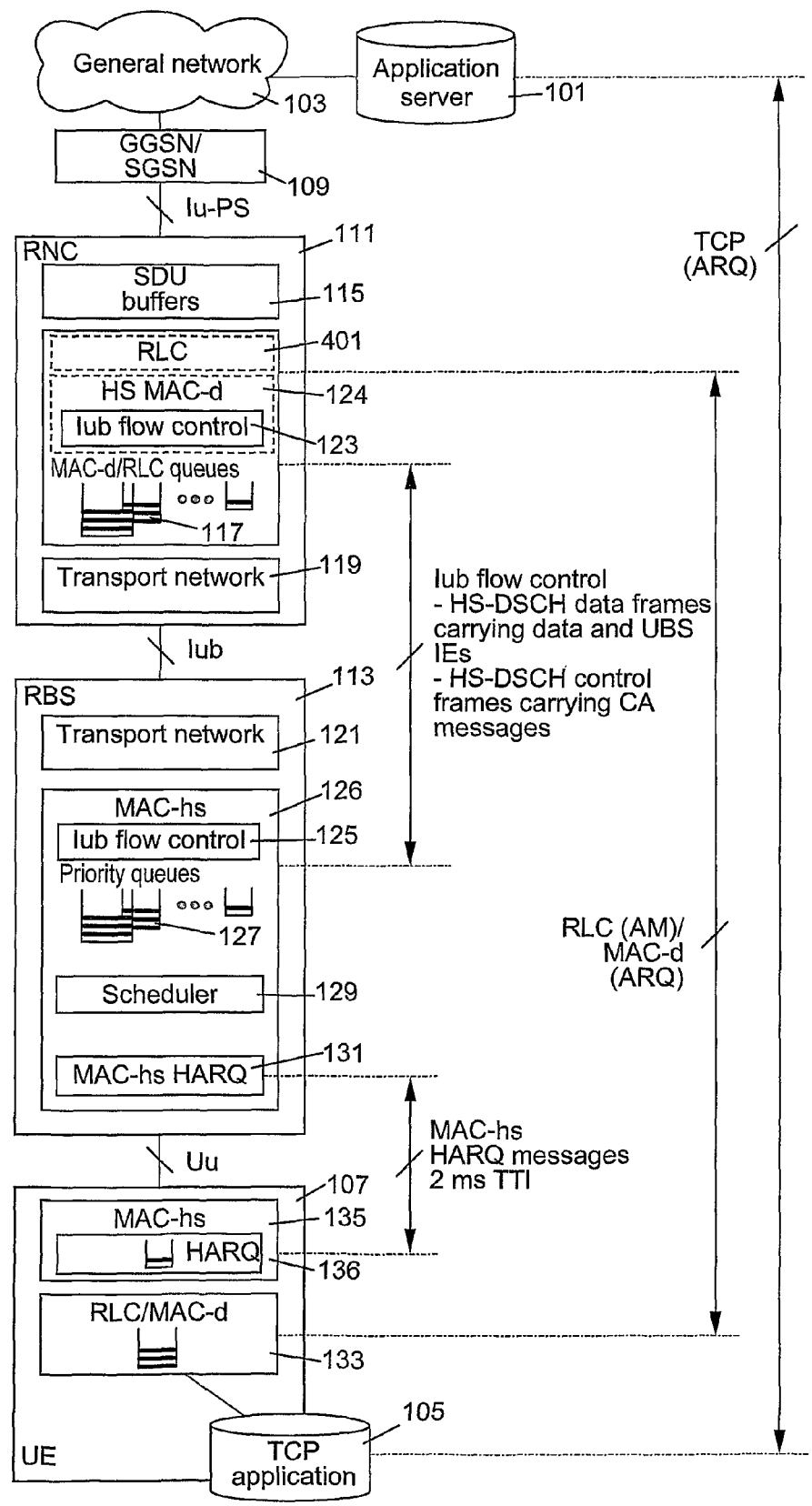
FIG. 3 is a diagram illustrating transmission of data from an application server to an application running in a user equipment using HSDPA and a flow control function for control of Iub.

Many packet data applications use the standardized transmission control protocol (TCP), as specified by IETF, for transmitting data. As seen in FIG. 3, data, such as an Internet page, can e.g. be sent from an application server 101 through a public data network (PDN), also called a general purpose network or general network 103, such as the Internet to an application 105 running in a user equipment 107, i.e. a mobile terminal. The IETF transmission control protocol has a window size of its own, which limits the number of bytes in the different buffers that the data has to pass between the application server 101 and the user equipment. The radio link control (RLC) sublayer has another window size. Automatic repeat request (ARQ) acknowledgement messages are used both according to TCP and in the RLC sublayer for controlling the correctness of transmissions.

The general purpose network 103 is connected to the mobile telephony system 104 at a gateway or support node 109, for GPRS this node including a gateway GPRS support node (GGSN) and a serving GPRS support node (SGSN). The gateway GPRS support node is in GPRS a router that serves as a gateway or interface between packet data networks and mobile telephony networks, in particular between a packet data network such as an internet protocol (IP) network (103) and a serving GPRS support node in the mobile telephony network 104.

The interface between a core network and a radio access network (RAN) is generally called Iu and the packet-switched interface between an SGSN and an RNC 111 is called Iu-PS. The interface between the RNC and an RBS 113 is called Iub and the interface between the RBS 113 and the mobile terminal 107 is called Uu.

Packets received from the gateway or support node 109 are first stored in SDU buffers 115. IP packets are stored here, which because of RLC protocol reasons, in particular sequence number limitations, cannot be stored in the RLC buffers.

Then, in the RNC 111 the information to be sent to an RBS is divided based on terminal and radio base station capabilities, subscription type, radio conditions and possibly QoS requirements, in data to be transmitted in dedicated channels and data to be transmitted in a shared channel, the latter type of data being that considered here.

A flow control (FC) function is used for controlling communication between the RNC 111 and the RBS 113, in particular the flow of data frames in the HS-DSCH, using the Iub interface and has the purpose of keeping priority queues (PQs) 127 in the RBS short and not to overflow the Iub transport network, i.e. the transport network between the RNC and the RBS, see the network portions 119, 121 in FIG. 3.

Iub Architecture for HSDPA

The flow control function includes portions 123, 125 located in the RNC 111 and in the RBS 113, respectively. In the RBS it is a part of the MAC-hs (Media Access Control for HSDPA) function 126. It interacts, using Iub protocol messages carried in Iub control frames, with the flow control portion 123 in the RNC that is part of the MAC-d (Media Access Control, dedicated channels) function 124 in the RNC 111, see also FIG. 4.

The flows that are controlled by the flow control function 123, 125 are the flows of MAC-d protocol data units (PDUs), carried in HS-DSCH data frames according to the Iub frame protocol (FP).

Each MAC-d PDU arriving to the portion 125 of the flow control function in the RBS 113 is stored in one of the priority queues 127, waiting to be selected by the scheduler function 129 of the RBS for transmission over the Uu interface to the user equipment 107.

In the RBS 113 one priority queue 127 is provided for each HS-DSCH MAC-hs connection of the connected user equipments 107 and one controlled flow of MAC-d PDUs is provided over the Iub interface to each priority queue. Each such flow is in the flow control function denoted a priority queue flow (PQF). A priority queue flow is defined as packets arriving for the same user having the same contents of the "Common Channel Priority Indicator" (CmCH-PI) field, as defined in standard documents. In practice, in most cases there is for each user equipment at each instant only one priority queue flow that is the downlink traffic flow for the respective user, though generally there may be a plurality of priority queues for each connected user equipment 107.

Each priority queue flow is transported over the Iub interface by one instance of the Iub frame protocol (FP) using a dedicated AAL2 (ATM Adaptation Layer No. 2) connection as transport bearer.

Figure 4:
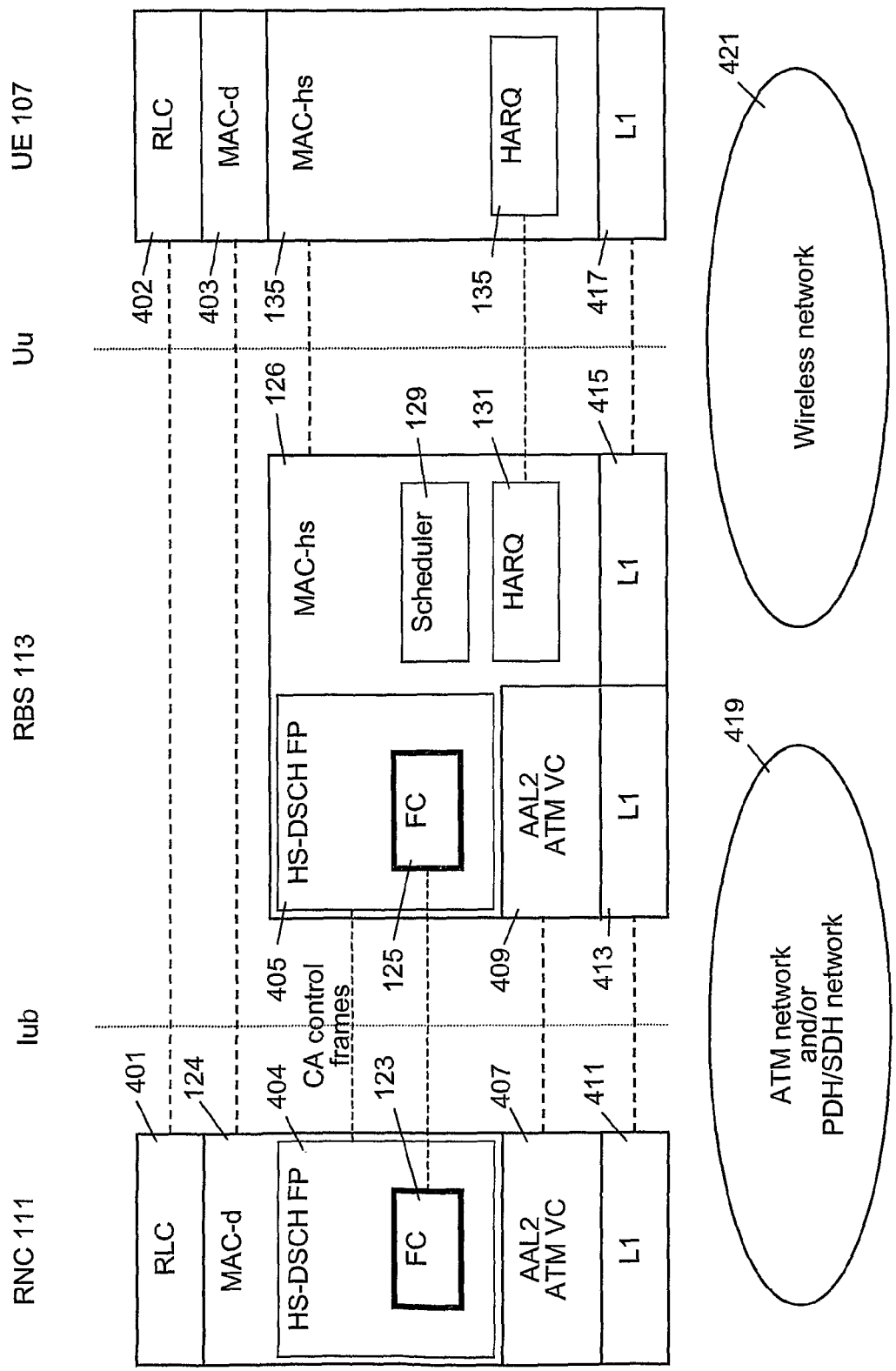
FIG. 4 is a diagram illustrating different layers in communication between an RNC and an RBS using HSDPA.

FIG. 4 illustrates the layer configuration and corresponding units of the Iub and Uu interfaces.

The radio link control sublayer portion 401 of the RNC 111 has the main purpose of ensuring a loss-free, i.e. reliable, link over the radio interface for TCP based data transfer. It provides reliability using error detection and recovery by retransmissions. The RLC does segmentation and reassembly of higher layer PDUs. Thus, if only a small part of a PDU has been lost, the full PDU must not be retransmitted. This way the end-to-end congestion control algorithm must not react to the changing radio conditions. The RLC 410 communicates with a radio link control sublayer portion 402 included in an RLC/MAC-d portion 133, see FIG. 3, of the user equipment 107.

The MAC-d function 124 in the RNC 111 communicates with an MAC-d function 403 included in the RLC/MAC-d portion 133 of the user equipment 107, see FIG. 3. Furthermore, the MAC-d function of the RNC 111 is here illustrated as including an HS-DSCH FP (Frame Protocol) handling unit 404. This frame protocol handling unit in turn includes the flow control portion 123 and communicates with the flow control portion 125 included in an HS-DSCH FP handling unit 405 of the MAC-hs function 126 of the RBS 113. The MAC-hs function of the RBS includes the flow control portion 125, the scheduler 129 and the MAC-hs HARQ function 131, see FIG. 3. The MAC-hs function 126 in the RBS communicates with the MAC-hs function 135 in the user equipment 107. The MAC-hs function of the user equipment includes an HARQ function 136, see also FIG. 4, communicating with the MAC-hs HARQ function 131 of the RBS 113.

The AAL2/ATM VC layer having portions 407, 409 in the RNC 111 and the RBS 113, and The physical layer (L1) portions 411 in the RNC 111, 413, 415 in the RBS 113 and 417 in the UE 107.

For the communication between the RBS 111 and the RNC a transport network 419 such an ATM network and/or a PDH/SDH network is used, compare the transport network portions 119, 121 of FIG. 3. For the communication between the RBS 111 and the UE 107 a wireless network 421 is used.

Flow Control Messages Between RNC and RBS

HSDPA data, i.e. MAC-d PDUs, are sent from the RNC 111 to the RBS 113. Each MAC-d flow of a given priority level is equal to one priority queue flow and is represented by one queue 117 in the RNC and one queue, a priority queue 127, in the RBS. A number of MAC-d PDUs are sent in each HS-DSCH FP data frame, belonging to the same MAC-d flow.

Figure 5:
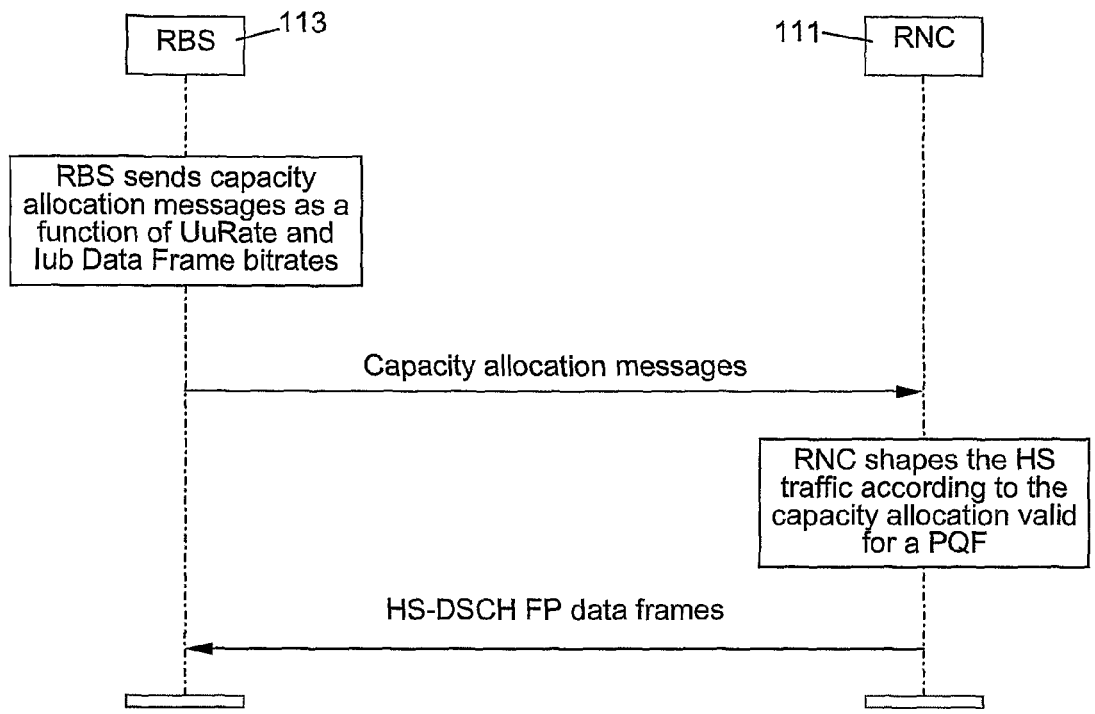
FIG. 5 is a transmission diagram illustrating a principle for flow control using standardized messages.
Figure 6:
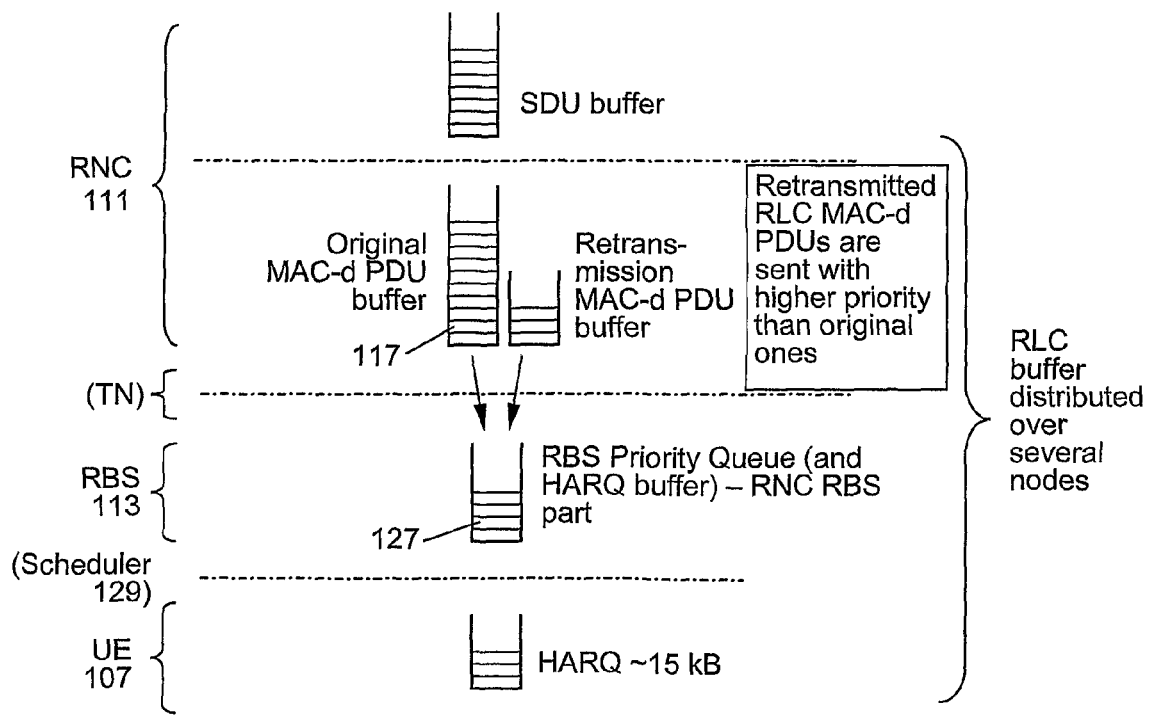
FIG. 6 is a schematic illustrating buffers in an RNC, an RBS and a UE.

Data frames sent over Iub for each priority queue flow is flow controlled using capacity allocation (CA) messages, sent in control frames from the RBS 113 to the RNC 111, see FIG. 5. A capacity allocation message specifies, as given by a combination of parameters, the maximum bitrate. i.e. the maximum number of MAC-d PDUs that are allowed to be transmitted during a predetermined time period for the considered priority queue flow. From such a message a minimum repetition period can also be obtained.

For a simple case the RBS 113 decides, based on the filling level of the respective buffer, i.e. the length of the respective priority queue, in the RBS, on air interface conditions, i.e. conditions related to the Uu interface, and on transport network congestion in Uu, the bitrate that should be allocated for the given priority queue to be used by the RNC 111 for transmission in the respective HS-DSCH. The RNC shapes data flows according to the last received capacity allocation messages. Message structures can be found in the document 3GPP TS 25.435, in particular FIG. 21A, "Data Frame", and FIG. 36, "Capacity Allocation", and the accompanying text.

The flow control function 123, 125 is aware of the average data rate available for a priority queue flow on the air interface between the RNC and the RBS or at least an estimate of said average data rate. It also knows the number of PDUs from that priority queue flow which are waiting in the RBS buffer for this queue 127. Based on this information the flow control function can decide to change the allocated rate of the considered priority queue flow. The main goal is to keep a target number of PDUs waiting in the RBS 113, i.e. not too many and not too few PDUs in each of the priority queues.

There is one RLC queue 117 per priority queue flow in the RNC 111 and one Mac-hs queue, i.e. priority queue 127, per priority queue flow in the RBS 113.

The buffers for the queues 117, 127 are designed in such a way that PDUs are most probably lost only in the transport network of Iu or in the air interface of Uu.

Purpose of Using a Flow Control Function

Iub traffic flows in HS-DSCHs are flow controlled by the flow control function 125 of the MAC-hs 126 in the RBS 113. The Iub protocol messages that can be used for flow control are specified in 3GPP TS 25.435 (Iub). The flow control function itself is not standardized.

The purpose of the flow control function is to keep an "appropriate" amount of MAC-d PDUs buffered in the RBS 113, i.e. to keep the RBS priority queues 127 short enough for RLC retransmissions but long enough to ensure throughput when scheduled.

The same logical RLC buffer for the priority queue flows can be seen as distributed over the RNC 111, RBS 113 and UE 107. The MAC-d PDUs to be retransmitted have a higher priority in the RNC than PDUs that are to be sent for the first time from the RNC, see FIG. 6. Therefore the RLC RBS portion, the priority queues 127, shall be "short" or not too long, this being one reason to use a flow control function for controlling transmission in the HS-DSCHs from the RNC 111 to the RBS 113.

HS-DSCH traffic is carried over a "best effort" type of quality of service (QoS) in the transport network 119, 121; 415 between an RNC and an RBS. The flow control function shall regulate the HS-DSCH traffic flow in such a way that loss of MAC-d PDUs, due to too long Iub transport delays, such as caused by overload of the transport network, becomes appropriate. There is a trade-off between having a high frame loss combined with a high bandwidth utilization and a low frame loss combined with a lower bandwidth utilization.

There are mainly two bandwidth capacity bottlenecks for HSDPA traffic in the transport networks between the RNC 111, the RBS 113 and the UE 107, both which must be considered in the flow control function:

Iub Interface

Radio Interface in Uu

A flow control function including a special method of allocating capacity for users, using "user states", will now be described with reference to FIGS. 7 and 8. These variables "user states", also called flow control states or priority queue flow states, are stored in the radio base station for each current user. In particular, detection of inactive users is used. This capacity allocation method can result in a better utilization of the transport network for Iub.

The method uses the current value of the standardized information element "User Buffer Size" (UBS) for each user for accomplishing the flow control. Priority queue flows having (User Buffer Size)>0 gets a calculated capacity allocation and users having (User Buffer Size)=0 during a predetermined time period, gets a "background" or minimum capacity allocation.

The user states, denoted pqfStates, are thus defined to have either one of the states active or inactive, these states denoted activePqf and inactivePqf. A user that has an inactive priority queue flow, i.e. for which its pqfstate=inactivePqf, does not compete for the available HS bandwidth in transmissions between the RNC and the RBS. Such a user gets a predefined capacity allocation with the purpose of being prepared when data is to be sent from the RNC, without the need of using a capacity request control frame. This predefined capacity allocation does not consume any significant portion of bandwidth taken from the calculated cell HS bitrate.

For a user that has an active priority queue, i.e. for which its pqfstate=activePqf, there are more data to be transmitted. This is indicated by the fact that the information element "User Buffer Size" is larger than zero. The information element "User Buffer Size" is included in HS-DSCH data frames as standardized. Such a user having an active priority queue flow gets a calculated capacity allocation bitrate.

An inactive priority queue flow, i.e. for which its pqfstate=inactivepqf, is a priority queue flow with a "context", i.e. a priority queue flow for which a priority queue 127 exists in the RBS 113, but for which there are no more data to be currently transmitted from the RNS 111. An active priority queue flow is set to be inactive, i.e. it gets its state changed to inactivePqf, if the information element "User Buffer Size" for this queue has been equal to zero for a period longer than a predefined time, denoted ubsZeroTime.

The capacity allocation method uses as input this fixed parameter ubsZeroTime that is hard-coded and the information element or variable "User Buffer Size" for each existing priority queue flow. The method produces as output the variable pqfstate for each existing priority queue flow. The information element "User Buffer Size" is, as standardized, sent by the RNC 111 and indicates the amount of data that is available in the RNC, or is traveling towards the RBS 113, after having received an HS-DSCH data frame or capacity request.

For each of the priority queue flows or at least for those of the priority queues that have been assigned one, a UBS inactivity timer is incremented every 2 ms TTI.

For an active priority queue flow:
1. as long as "User Buffer Size">0, the variable pqfstate for the user of the priority queue flow remains equal to activePqf.
2. as soon as "User Buffer Size" becomes equal to zero, a UBS inactivity timer for this flow is reset and started. If "User Buffer Size" has been equal to zero for the predetermined time period ubsZeroTime, the variable pqfState is set to inactivePqf. If "User Buffer Size" becomes larger than zero before the UBS inactivity timer has expired, the variable pqfstate remains equal to activePqf.

For an inactive priority queue flow:
1. as long as "User Buffer Size" is equal to zero, the variable pqfstate remains equal to inactivepqf.
2. if "User Buffer Size" becomes larger than zero, the variable pqfState is set to activePqf.

Figure 7:
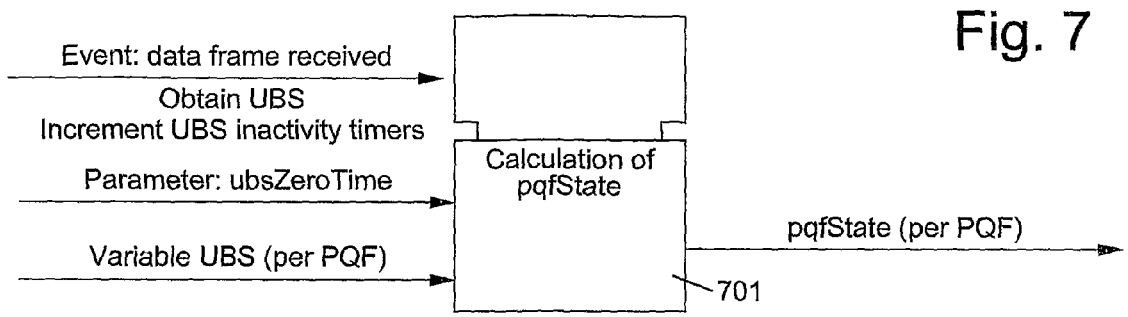
FIG. 7 is a diagram illustrating calculation of the state of a priority queue flow.
Figure 8:
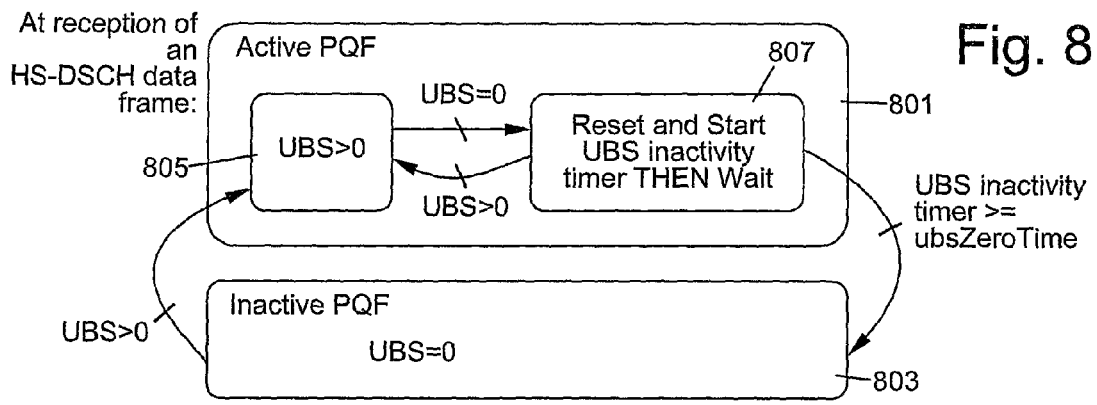
FIG. 8 is a state machine of changes of the state of a priority queue flow.

As seen in FIG. 7, in the RBS 113, at each time when a data frame is received from the RNC 111, the UBS is extracted and the inactivity timers are incremented. The state of the priority queue flow having data in the received data frame is calculated in a state calculation function 701. A state machine of the state calculation function illustrates, as seen in FIG. 8, that each priority queue flow can take either an active state 801 or an inactive state 803.

Thus, at reception of an HS-DSCH data frame from the RNC 111, the new UBS is compared to zero.

An active priority queue flow can have the variable UBS larger than zero or equal to zero, see the vivid substate 805 and the waiting substate 807, respectively.

If the previous UBS for the active priority queue flow was larger than zero, i.e. the priority queue flow taking the vivid substate 805, and the new UBS is equal to zero, the waiting substate 807 is instead taken in which the UBS inactivity timer is reset and started.

If the active priority queue flow is in the waiting substate 807 and the new UBS is larger than zero, the vivid substate 805 is instead taken.

If the active priority queue flow is in the waiting substate 807, the new UBS is equal to zero and the UBS inactivity timer is larger than or equal to the parameter ubsZeroTime, the priority queue flow becomes inactive and takes the inactive state 803.

An inactive priority queue flow is always in the state 803 but when the new UBS is larger than zero, it becomes active and passes to the vivid substate 805 of the active state 801.

In the calculation of capacity allocation for active and inactive priority queue flows the air-interface HS estimated bitrate is compared to the available Iub HS traffic bandwidth. The calculated capacity allocated bitrate, denoted caCalcBitrate, for each of the active priority queue flows is the minimum of the air-interface and Iub bitrates available for the considered priority queue flow. The Iub bitrate is calculated by dividing the estimated available Iub capacity for all priority queues among the different priority queues. An example of the calculation method can be found in the simultaneously filed International patent application, "FLOW CONTROL IN UMTS", for Telefonaktiebolaget L M Ericsson, inventors Peter Lundh, Szilveszter Nadas, that is incorporated by reference herein.

Inactive priority queue flows get a minimum CA Bitrate, denoted minCaRate, and thus do not use any significant capacity from the common Iub capacity pool. It can be so small that there is no need for reservation.

The calculation of capacity allocation for active and inactive priority queue flows uses as inputs the parameter minCaRate and the variable pqfstate for each currently existing priority queue flow. It produces as output the variable caCalcBitrate. The calculation is given by the following pseudo-code:

```
IF pqfState is activePqf,
THEN
    calculate caCalcBitrate normally
ELSE
    caCalcBitrate = minCaRate
```

Figure 9:
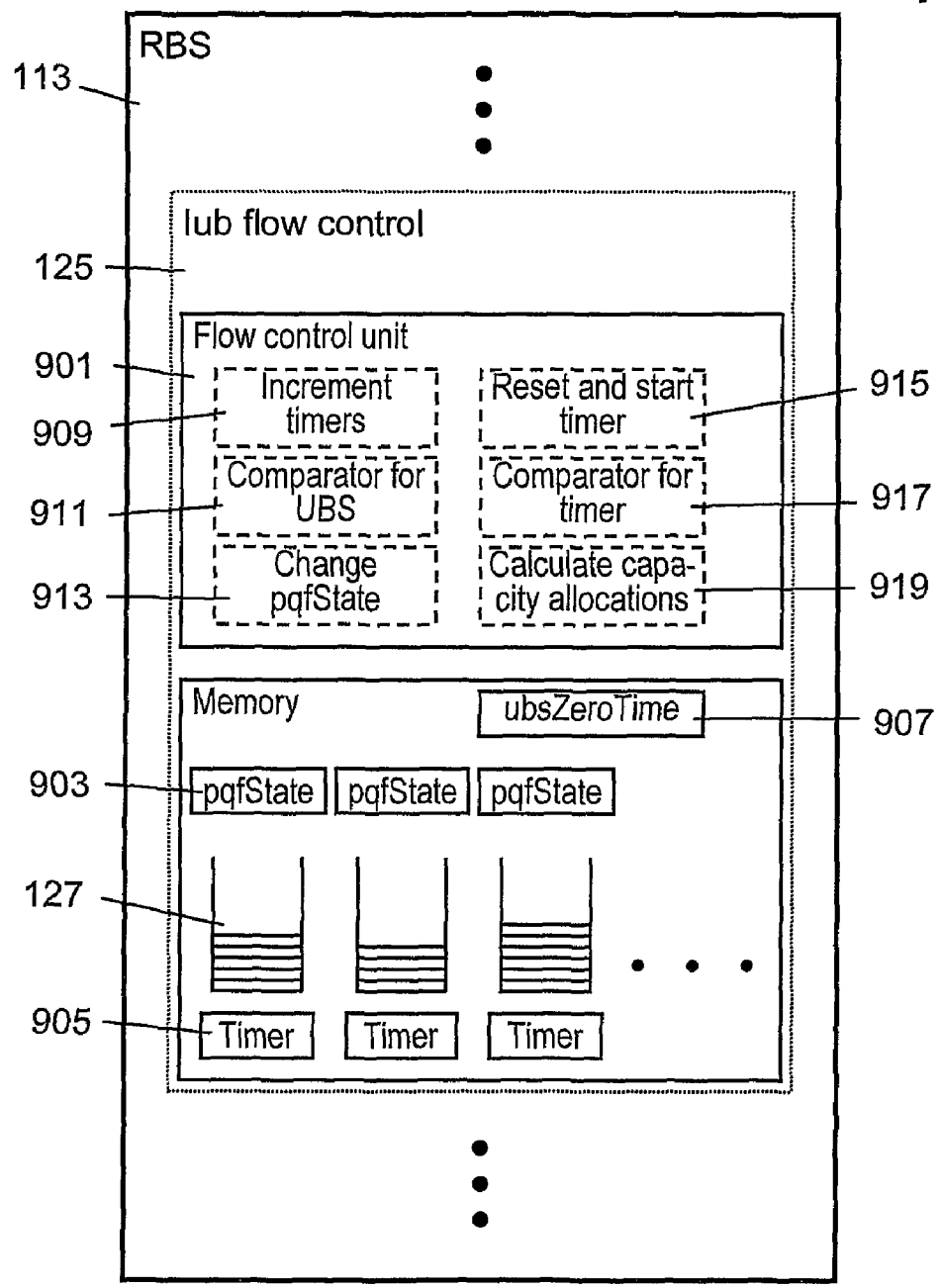
FIG. 9 is a schematic of a radio base station illustrating a flow control unit and related memory cells.

For performing the flow control function a flow control unit 901 and some memory cells have to be introduced in the RBS 133 as seen in the diagram of FIG. 9. The memory cells include, for each priority queue 127 and hence for each priority queue flow a memory cell 903 for storing the value of the variable pqfstate and a memory cell 905 for storing the UBS inactivity timer. Also there is a memory cell 907 for the fixed threshold value ubsZeroTime. The flow control unit 901 includes a unit 909 for incrementing the UBS inactivity timers stored in the cells 905, a comparator 911 for comparing UBS of a received data frame to zero, a unit 913 for changing the value of the variable pqfstate stored in one of the cells 903 when required, a unit 915 for resetting and starting one of the UBS inactivity timers stored in the cells 905 when required, a comparator 917 for comparing one of the UBS inactivity timers stored in the cells 905 to the fixed value of ubsZeroTime when required, and a unit 9191 for calculating, based primarily on the number of priority queues for which the variable pqfState has the value activePqf, but also considering the number of priority queues for which the variable pqfstate has the value inactivePqf, the capacity allocations for all priority queues.

Typically, the available Iub HS traffic bandwidth, that is equal to the total transport network capacity available for all PQFs of the RBS, can be about 0.5 Mbps-30 Mbps. This value must be estimated in the RBS. The minimum CA Bitrate" can typically be 8 kbps-32 kbps, this being in all practical cases a very insignificant portion of the available Iub HS traffic bandwidth.

The invention claimed is:

1. A network including a first node and a second node, wherein data frames are transmitted from the first node to the second node, each data frame carrying information belonging to one of a plurality of data flows, said network comprising:
    a determining unit for determining at periodically repeated times, for each of the data flows, whether there are more data frames in the first node waiting to be transmitted; and,
    a capacity allocating unit for allocating:
        for each of those data flows for which no data frames have been waiting to be transmitted for a predetermined time period, a predetermined minimum amount of the totally available bitrate or bandwidth for transmission from the first node to the second node, said predetermined minimum amount greater than zero; and,
        for each of the remaining data flows, a share of the rest of the totally available bitrate or bandwidth, so that the sum of the shares of all said remaining data flows is equal to said rest, for transmission from the first node to the second node.

2. The network according to claim 1, further comprising a storing/setting unit connected to the determining unit for storing, at the periodically repeated times, a value for each of the data flows indicating the result of the determining in a state indicator cell or setting an indicator to a value indicating the result of the determining.

3. The network according to claim 1, further comprising a starting/setting unit connected to the determining unit for starting, at the periodically repeated times, a timer for each of those data flows for which at the current time there is no data frame waiting to transmitted but for which, at the directly previous time, there was at least one data frame waiting to be transmitted, or setting a counter to an initial value.

4. The network according to claim 3, further comprising an incrementing/changing unit for incrementing, at the periodically repeated times, each of the timers already started or changing each of the counters by one step.

5. The network according to claim 3, further comprising a comparator for comparing, at the periodically repeated times, each of the timers already started or counters to a predetermined value, and a changing unit for changing, for each of those data flows for which the result of the comparing indicates that the timer or counter has reached or passed the predetermined value, said value indicating the result of the determining or said indicator, and the allocating unit arranged to allocate to each of said data flows the predetermined minimum amount of the totally available bitrate or bandwidth.

6. The network according to claim 1, wherein the first node is a radio network controller and the second node is a radio base station in a universal mobile telecommunications system (UMTS), wherein the determining unit is arranged to use information in the field "User Buffer Size" (UBS) in data frames received by the second node.

7. A data receiving node for a network including a data transmitting node, the data transmitting node transmitting data frames to the data receiving node, each data frame carrying information belonging to one of a plurality of data flows, said data receiving node comprising:
    a determining unit for determining at periodically repeated times, for each of the data flows, whether there are more data frames in the data transmitting node waiting to be transmitted; and,
    a capacity allocating unit for allocating:
        for each of those data flows for which no data frames have been waiting to be transmitted for a predetermined time period, a predetermined minimum amount of the totally available bitrate or bandwidth for transmission from the data transmitting node to the data receiving node, said predetermined minimum amount greater than zero; and,
        for each of the remaining data flows, a share of the rest of the totally available bitrate or bandwidth, so that the sum of the shares of all said remaining data flows is equal to said rest, for transmission from the data transmitting node to the data receiving node.

8. The data receiving node according to claim 7, further comprising a storing/setting unit connected to the determining unit for storing, at the periodically repeated times, a value for each of the data flows indicating the result of the determining in a state indicator cell or setting an indicator to a value indicating the result of the determining.

9. The data receiving node according to claim 7, further comprising a starting/setting unit connected to the determining unit for starting, at the periodically repeated times, a timer for each of those data flows for which at the current time there is no data frame waiting to transmitted but for which, at the directly previous time, there was at least one data frame waiting to be transmitted, or setting a counter to an initial value.

10. The data receiving node according to claim 9, further comprising an incrementing/changing unit for incrementing, at the periodically repeated times, each of the timers already started or changing each of the counters by one step.

11. The data receiving node according to claim 10, further comprising a comparator for comparing, at the periodically repeated times, each of the timers already started or counters to a predetermined value, and a changing unit for changing, for each of those data flows for which the result of the comparing indicates that the timer or counter has reached or passed the predetermined value, said value indicating the result of the determining or said indicator, and the allocating unit arranged to allocate to each of said data flows the predetermined minimum amount of the totally available bit rate or bandwidth.

12. The data receiving node according to claim 7, characterized in that it is a radio base station in a universal mobile telecommunications system (UMTS) receiving data frames transmitted from a data transmitting node being a radio network controller, and that the determining unit is arranged to use information in the field "User Buffer Size" (UBS) in data frames received by the second node.

13. A method of transmitting data frames from a first node to a second node, each data frame carrying information belonging to one of a plurality of data flows, comprising the steps of:
determining at periodically repeated times, for each of the data flows, whether there are more data frames in the first node waiting to be transmitted;
allocating, for each of data flows for which no data frames have been waiting to be transmitted for a predetermined time period, a predetermined minimum amount of the totally available bit rate or bandwidth, said predetermined minimum amount greater than zero; and,
allocating, for each of the remaining data flows, a share of the rest of the totally available bit rate or bandwidth, so that the sum of the shares of all said remaining data flows is equal to said rest.

14. The method according to claim 13, further comprising the step of storing, after the step of determining at the periodically repeated times, a value for each of the data flows indicating the result of the determining or setting an indicator to a state indicating the result of the determining.

15. The method according to claim 13, further comprising the step of starting, after the step of determining at the periodically repeated times, a timer for each of those data flows for which at the current time there is no data frame waiting to transmitted but for which, at the directly previous time, there was at least one data frame waiting to be transmitted, or setting a counter to an initial value.

16. The method according to claim 15, further comprising the step of incrementing, after the step of determining at the periodically repeated times, each of the timers already started or changing each of the counters by one step.

17. The method according to claim 16, further comprising the step of comparing, after the step of determining at the periodically repeated times, each of the timers already started or counters to a predetermined value, and changing, for each of those data flows for which the result of the comparing indicates that the timer or counter has reached or passed the predetermined value, said value indicating the result of the determining or said indicator, and thus, allocating to each of said data flows the predetermined minimum amount of the totally available bit rate or bandwidth.

18. The method according to claim 13, wherein the first node is a radio network controller and the second node is a radio base station in a universal mobile telecommunications system (UMTS), wherein in the step of determining at the periodically repeated times, information in the field "User Buffer Size" (UBS) in data frames received by the second is used.

* * * * *